(12) United States Patent  
Seth et al.

(10) Patent No.: US 6,496,789 B2  
(45) Date of Patent: Dec. 17, 2002

(54) SPINDLE CHARACTERIZATION SYSTEM

(75) Inventors: Brij B. Seth, Canton, MI (US); Michael David Deegan, Farmington Hills, MI (US); Brian Wells, Tecumseh (CA); Marcus Hermann Girgis, Windsor (CA)

(73) Assignee: Ford Global Technologies, Inc., Dearborn, MI (US)

( * ) Notice: Subject to any disclaimer, the term of this patent is extended or adjusted under 35 U.S.C. 154(b) by 87 days.

(21) Appl. No.: 09/738,380

(22) Filed: Dec. 16, 2000

(65) Prior Publication Data

US 2002/0077776 A1 Jun. 20, 2002

(51) Int. Cl.[7] .............................. G06F 19/00; G01N 3/08
(52) U.S. Cl. ............................. 702/182; 73/824; 73/847
(58) Field of Search ................................. 702/182, 183, 702/33, 35, 41, 42, 43; 384/227; 301/126, 131; 73/862.21, 862.392, 862.393, 824, 847, 865.6; 700/9, 17, 32, 275; 340/679

(56) References Cited

U.S. PATENT DOCUMENTS

| | | | | |
|---|---|---|---|---|
| 3,112,643 A | * | 12/1963 | Lanahan | 73/162 |
| 3,830,097 A | * | 8/1974 | Acharkan et al. | 73/37.5 |
| 4,110,829 A | * | 8/1978 | Boys | 702/33 |
| 4,182,166 A | * | 1/1980 | Herr, Jr. | 73/862.09 |
| 4,283,957 A | * | 8/1981 | Zobrist et al. | 73/814 |
| 4,354,305 A | * | 10/1982 | Plummer et al. | 483/31 |
| 4,369,563 A | * | 1/1983 | Williamson | 483/7 |
| 4,516,509 A | * | 5/1985 | Langenegger et al. | 108/147 |
| 4,785,913 A | * | 11/1988 | Maurer et al. | 184/6.26 |
| 4,929,130 A | * | 5/1990 | Diebolt et al. | 409/136 |
| 5,170,358 A | * | 12/1992 | Delio | 700/177 |
| 5,219,389 A | * | 6/1993 | Gutman | 73/162 |
| 5,533,403 A | * | 7/1996 | Haeg et al. | 73/669 |
| 5,663,894 A | | 9/1997 | Seth et al. | 702/56 |
| 6,044,696 A | * | 4/2000 | Spencer-Smith | 73/117 |

* cited by examiner

Primary Examiner—Patrick Assouad
(74) Attorney, Agent, or Firm—Damian Porcari (57) ABSTRACT

A spindle characterization system for characterizing performance of a spindle used in an industrial machine includes a machine base for providing a mounting and support surface and having a recessed portion. The spindle characterization facility includes a table base assembly for supporting the spindle disposed within the recess portion and the table base assembly has a table top and height adjustment mechanism for adjusting the height of the table top. The spindle characterization system also includes a spindle mounting mechanism having a top portion mounted to the spindle and a bottom portion mounted to the table top, and a spindle forcing assembly operatively connected to the spindle, and the spindle forcing assembly generates an axial load, radial load and a torque that is applied to the spindle to simulate a machine tool load. The spindle characterization facility further includes a programmable controller operatively connected to the spindle forcing assembly for providing computerized numeric control, and a computer system in communication with the programmable controller.

20 Claims, 7 Drawing Sheets

SPINDLE CHARACTERIZATION SYSTEM

BACKGROUND OF THE INVENTION

1. Field of the Invention

The present invention relates generally to spindles for industrial machines and, more specifically, to a system for characterizing performance of a spindle used in an industrial machine.

2. Description of the Related Art

Industrial machines are frequently used in production environments, such as automotive vehicle production. It is especially important that these industrial machines provide reliable performance to avoid costly production delays due to machine malfunction. Machine spindle failures are a known contributor to machine downtime in a production facility. In the past, various methods have been used to increase the reliability, predictability and maintainability of the industrial machine. For example, the performance of a major component of the industrial machine, such as the spindle, has heretofore been evaluated within a test environment. These tests are typically performed under steady state conditions at a single operating speed, and could only verify a few characteristics of the spindle. While steady state testing may adequately characterize certain features of the spindle, it is not a sufficient indicator of long-term performance within a particular manufacturing environment.

In addition, environmental factors, such as vibration, temperature or coolants, may affect the performance and reliability of machine components. One approach is to monitor major machine components, in order to isolate a suspect component. However this approach is an inadequate indicator of long-term machine performance. Another approach is characterization of the machine components, structure, tooling and workpiece as an integral system. An example of such an approach is disclosed in commonly assigned U.S. Pat. No. 5,663,894, to Seth et al., "System and Method For Machining Process Characterization Using Mechanical Signature Analysis" the disclosure of which is hereby incorporated by reference. While this method works well, it does not provide for characterization of a particular component, such as a spindle, during the design phase for that component.

Thus, there is a need in the art for a spindle characterization system to test and measure the performance characteristics of a spindle under dynamic load and environmental conditions similar to those encountered in a production environment.

SUMMARY OF THE INVENTION

Accordingly, the present invention is a spindle characterization system for characterizing performance of a spindle used in an industrial machine. The spindle characterization system includes a machine base for providing a mounting and support surface and having a recessed portion. The spindle characterization system also includes a table base assembly for supporting the spindle disposed within the recess portion, and the table base assembly includes a table top and height adjustment mechanism for adjusting the height of the table top. The spindle characterization system further includes a spindle mounting mechanism having a top portion mounted to the spindle and a bottom portion mounted to the table top, and a spindle forcing assembly operatively connected to the spindle, and the spindle forcing assembly generates an axial load, radial load and a torque that is applied to the spindle to simulate a machine tool load. The spindle characterization facility includes a programmable controller operatively connected to the spindle forcing assembly for providing computerized numeric control, and a computer system in communication with the programmable controller.

One advantage of the present invention is that a spindle characterization system is provided that verifies the performance of a spindle under environmental conditions similar to a production environment. Another advantage of the present invention is that spindle characteristics are determined under oscillatory, radial, axial and torsional loads replicating machining loads occurring under actual machining operations. Still another advantage of the present invention is that numerous spindle characteristics, including dynamic stiffness, vibration, and thermal characteristics, can be analyzed under a variety of operating conditions. Yet another advantage of the present invention is that the analysis of the spindle's characteristics can be used in enhancing the design of the spindle, to improve the operating performance of the spindle within a manufacturing environment. Still yet another advantage of the present invention is that performance verification of a spindle tested by the system enhances the robustness and reliability of spindle designs. A further advantage of the present invention is that the system includes a test stand base that has increased dynamic stiffness, so as not to influence the integrity of the spindle characterization.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Referring to FIGS. 1 through 4C, one embodiment of a spindle characterization system 10, according to the present invention for a spindle 12 is illustrated. It should be appreciated that, in this example, the spindle 12 is used in an industrial machine (not shown) within a manufacturing production environment. Advantageously, the spindle characterization system 10 provides for the quantitative analysis of performance characteristics of a spindle design under conditions that simulate an intended manufacturing environment.

The spindle characterization system 10 provides for the testing of the spindle 12. It is contemplated that the system 10 can be adapted to test and monitor spindles 12 with various features, including belt driven or integral motor spindles up to 50 HP and 15,000 RPM; grease, air/oil or flooded oil lubrication; air positive internal pressure or air purge for seal operation; or controlled temperature chiller flow. Advantageously, the system 10 can measure many characteristics of the spindle 12, including dynamic stiffness, response over wide speed variations, and acceleration/deceleration response with or without assisted inertia. The system 10 can also measure vibration and thermal characteristics of the spindle 12 under various operating conditions, including idle, axial, radial and torsional loads; or oscillatory axial, radial and torsional loads; or dry or with controlled temperature flush coolant and through coolant flows. The system 10 can further measure characteristics relating to belt tension and thermal displacement.

The spindle characterization system 10 includes a structure 14 for housing components within the system 10. An interior portion of the structure 14 is accessible to a user 16 via a door 18. The system 10 includes a machine base 15 that provides a mounting and support surface, in a manner to be described. The machine base 15 includes a recessed portion 24 for a table base assembly 20 disposed therein. The table base assembly 20 illustrated in FIGS. 3A and 3B includes a generally planar table top 22 that provides a mounting and support surface. The table base assembly 20 includes a height adjustment mechanism 26 to adjust the height of the table top 22 in a vertical direction to account for variations in spindle size. In this example, the height adjustment mechanism 26 includes a manual vertical adjustment wheel 28 operatively attached to a ball screw mechanism (not shown) as is known in the art to raise or lower the height of the table top 22. The height adjustment mechanism 26 also includes a locking mechanism 27, such as a manual clamp positioned on the ball screw mechanism, to maintain the table position once the height has been set by the user 16.

Figure 1:
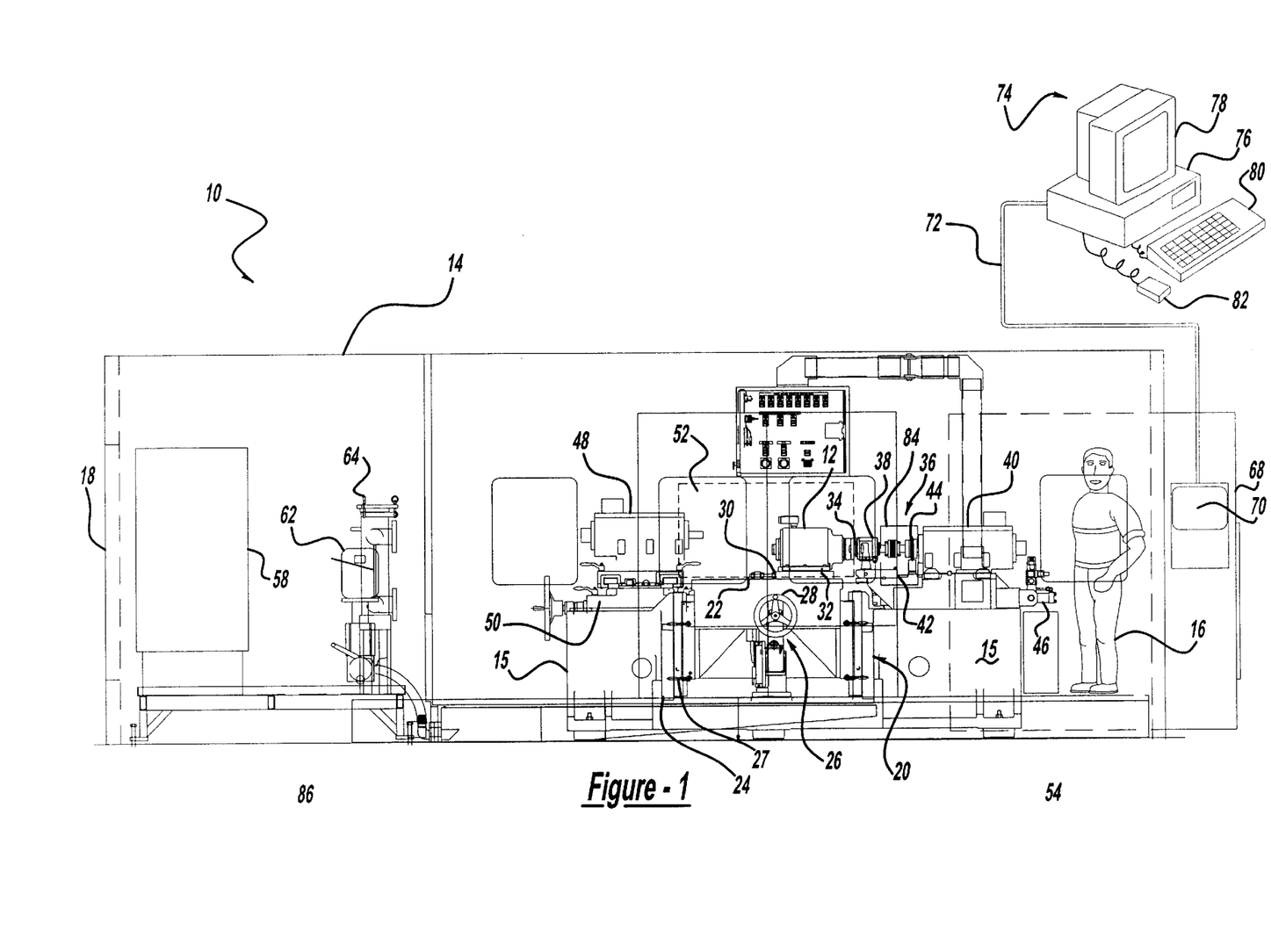
FIG. 1 is a front view of a spindle characterization system, according to the present invention.
Figure 2:
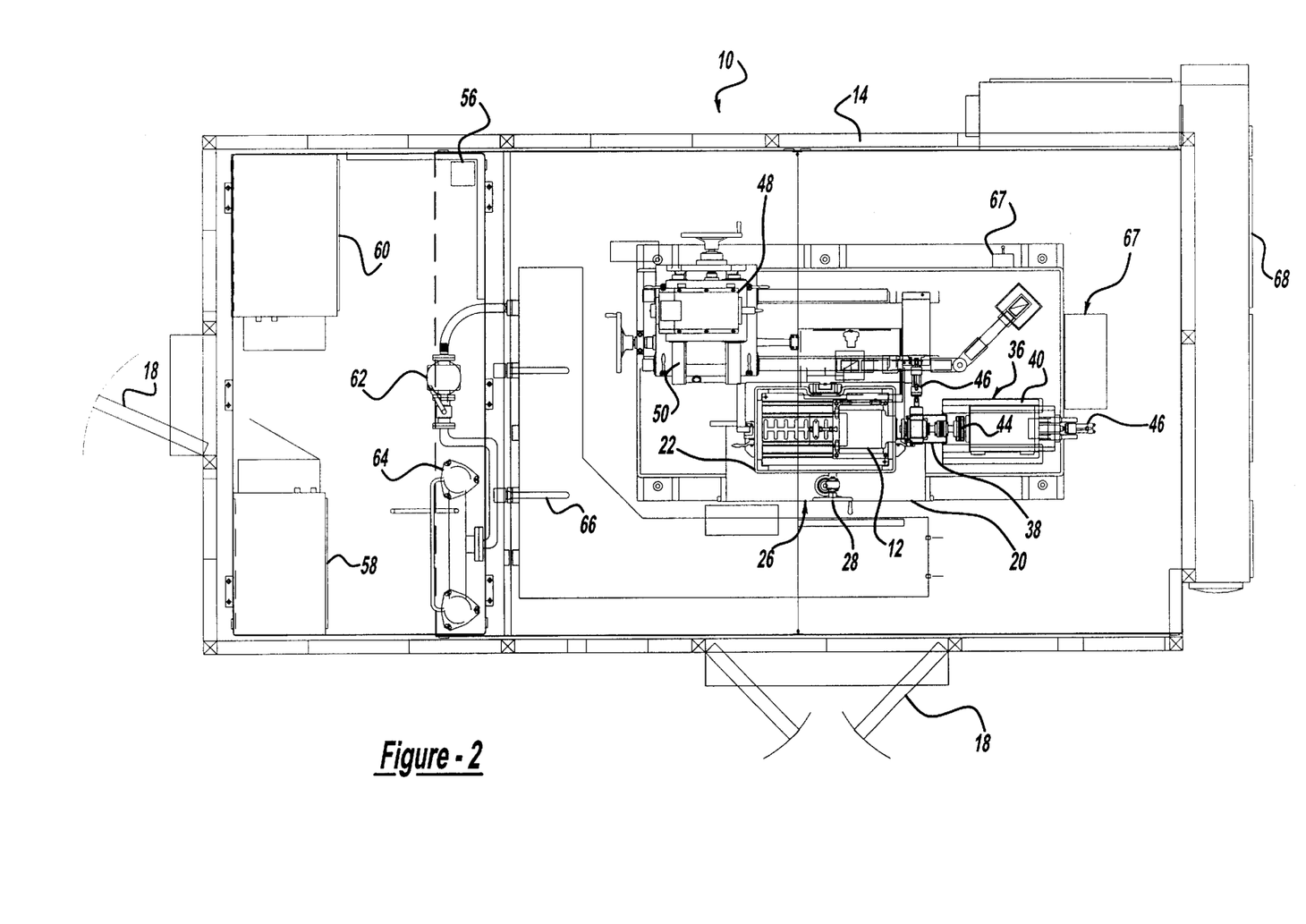
FIG. 2 is a top view of a spindle characterization system of FIG. 1.
Figure 3A:
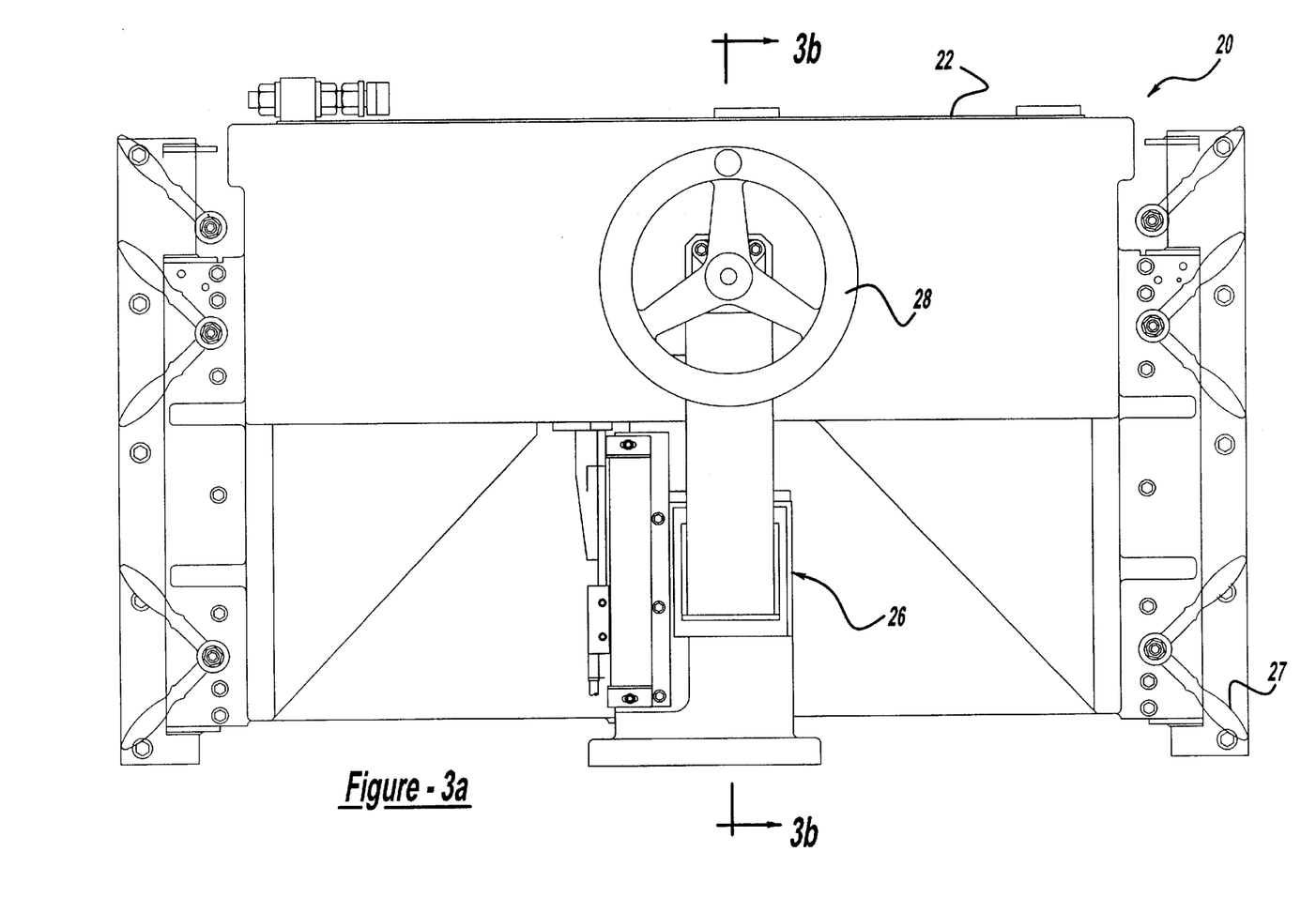
FIG. 3A is a side view of a table base assembly of the spindle characterization system of FIG. 2.
Figure 3B:
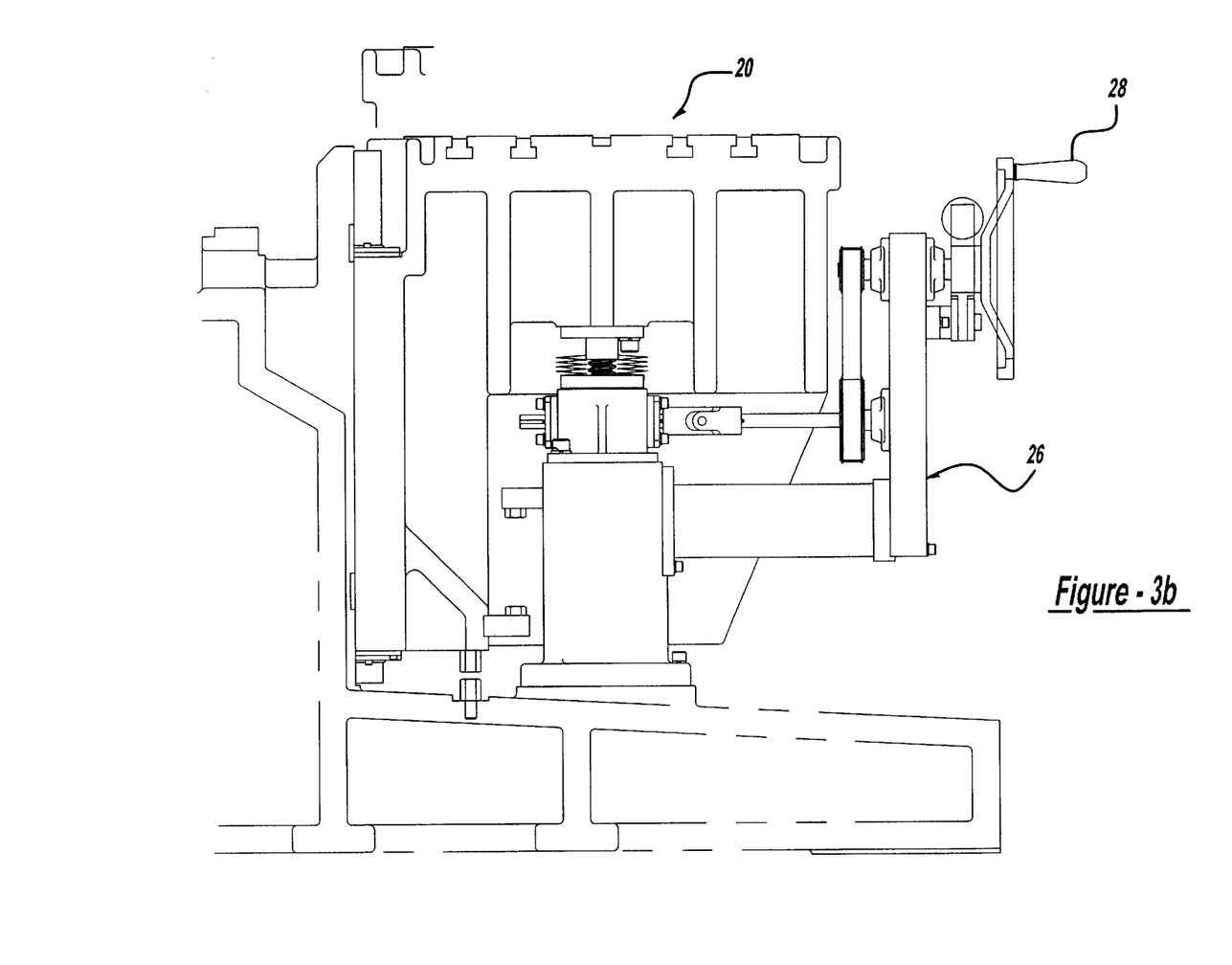
FIG. 3B is a sectional view taken along line 3—3 of FIG. 2.

The table base assembly 20 is rigidly constructed from a metal material to increase the dynamic stiffness of the table base assembly 20. Advantageously, the vibration of the spindle 12 is not influenced by potential vibrational characteristics of the table base assembly 20 and components attached thereon.

The spindle characterization system 10 includes a spindle mounting mechanism 30 fixedly attached to the table base assembly 20, and in particular the table top 22. The spindle mounting mechanism 30 provides a rigid support for the spindle 12 during the performance characterization. The spindle mounting mechanism 30 includes a base plate 32 for attaching the spindle 12 to the table top 22. Preferably, the base plate 32 is rigidly attached to the table top 22 by fasteners such as bolts. Preferably, the spindle 12 is mounted to the base plate 32 by fasteners such as bolts, keys, push pull blocks or the like. It should be appreciated that a top portion of the base plate 32 is adapted to be compatible with the mounting requirements of the various spindle types, and may include corresponding bolt holes, a thrust key, push pull blocks or the like.

The spindle mounting mechanism 30 also includes a spindle face adapter 34 to interface various types of spindles 12 with a forcing fixture 38 to be described. In this example, the spindle face adapter 34 is a disc, with one side designed to mate with a face portion of the spindle 12, and the other side designed to mount to the forcing fixture 38. It is contemplated that the spindle mounting mechanism 30 may include other types of adapters (not shown), such as plates or belts and pulleys, to facilitate mounting various types of spindles 12 to the spindle mounting mechanism 30.

Figure 4A:
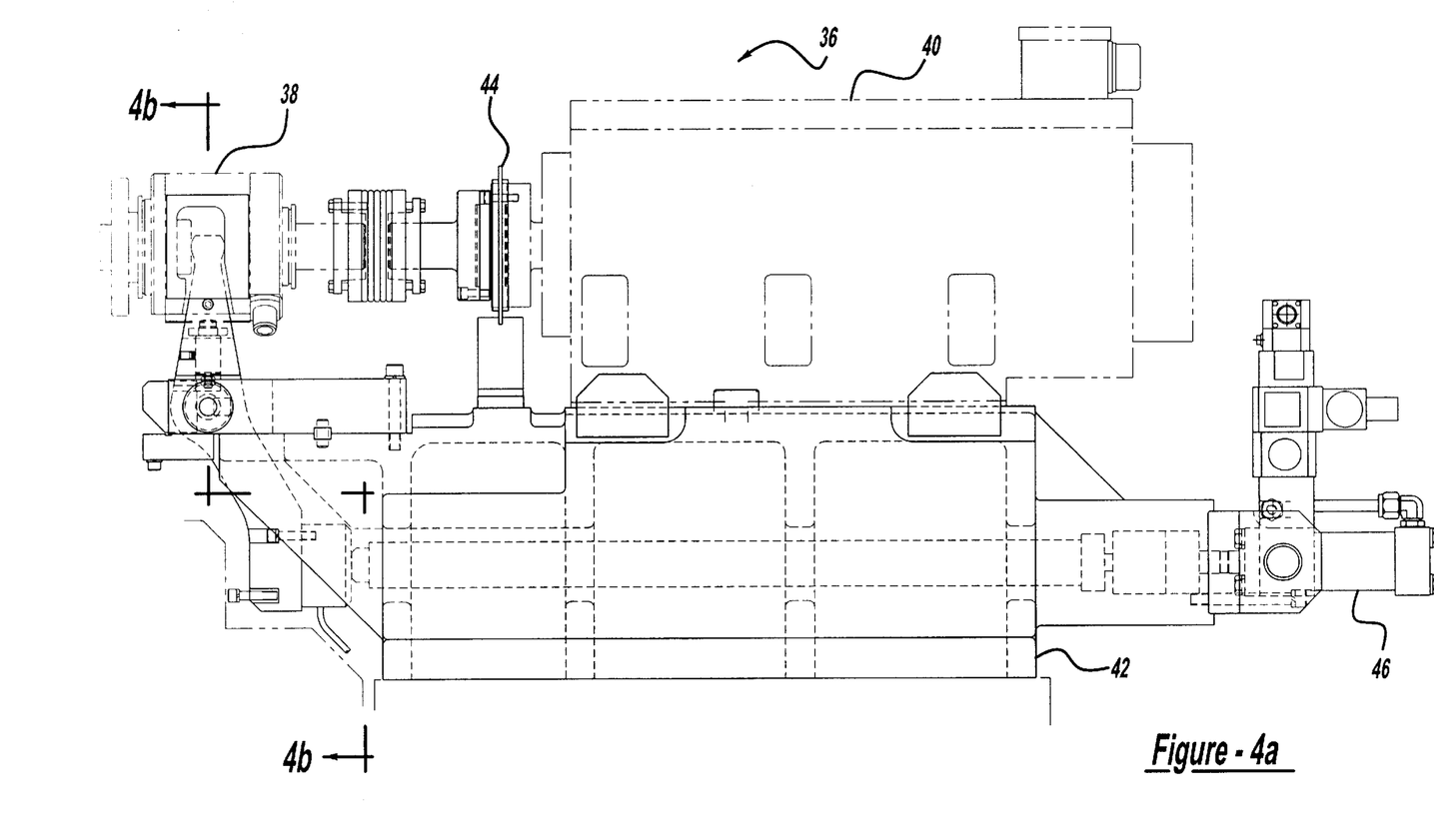
FIG. 4A is a front view of a spindle forcing mechanism for the spindle characterization system of FIG. 1.
Figure 4B:
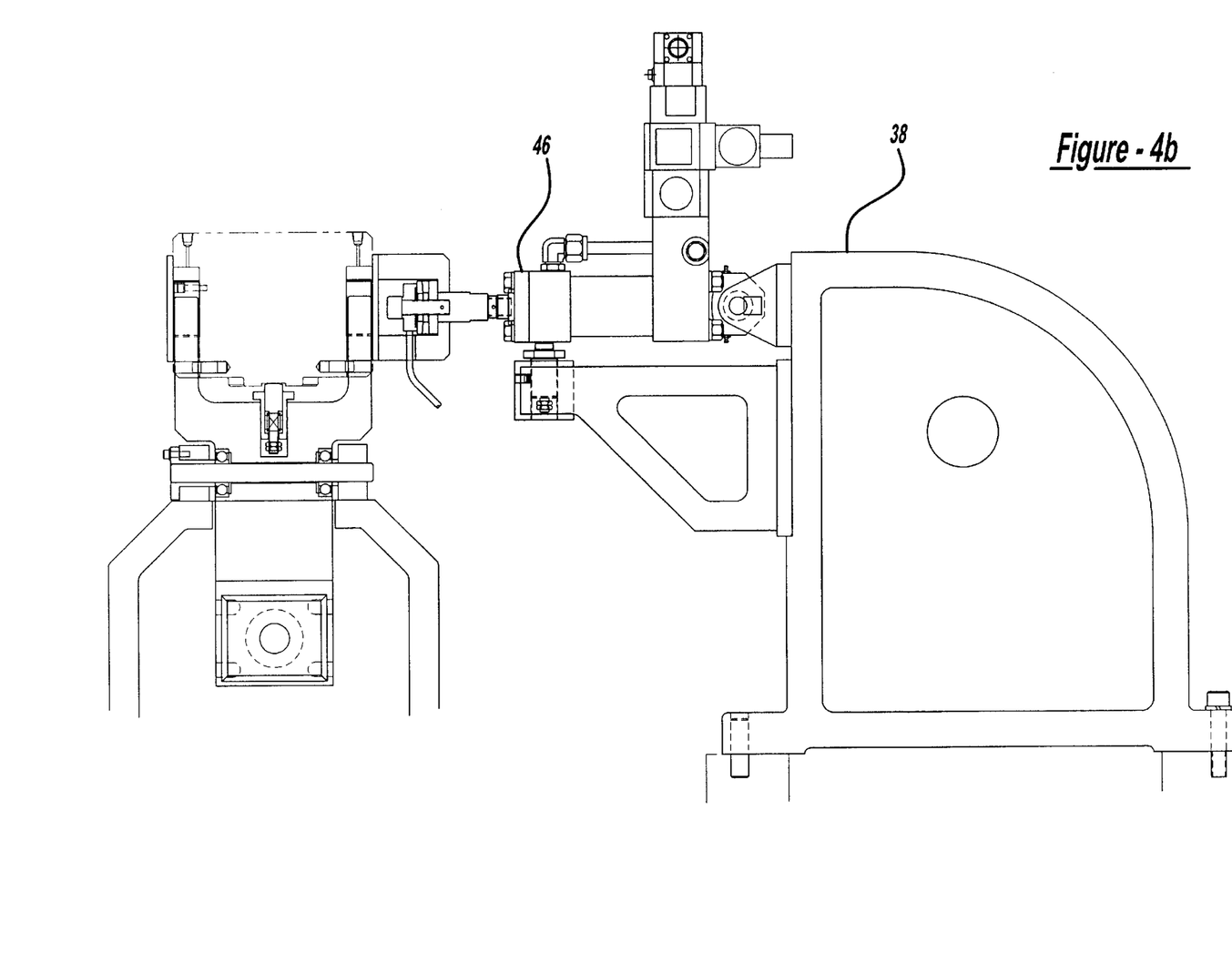
FIG. 4B is a sectional view taken along line 4—4 of FIG. 4A.
Figure 4C:
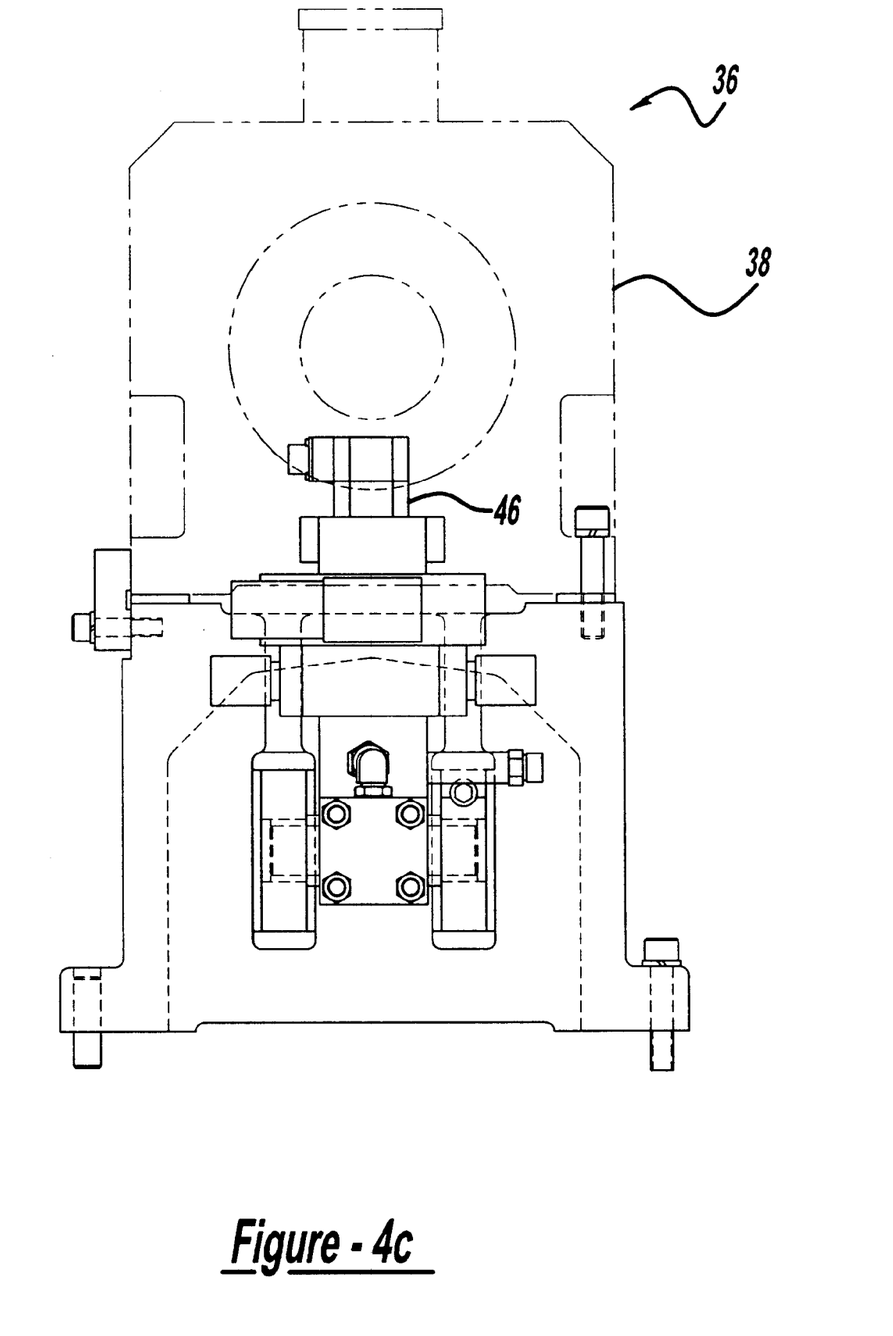
FIG. 4C is a side view of a spindle forcing mechanism of FIG. 4C.

The spindle characterization system 10 includes a spindle forcing assembly 36 as shown FIGS. 4A through 4C. The spindle forcing assembly 36 is positioned in front of the spindle 12. The spindle forcing assembly 36 includes a forcing fixture 38, a load motor/dynamometer 40 and a support 42 for the forcing fixture 38 and load motor 40. The spindle support 42 is a generally planar member, and is rigidly attached to the machine base 15 by fasteners such as bolts. Preferably, one end of the spindle forcing support 42 provides a support and a mounting surface for the forcing fixture 38, while another end of the spindle forcing support 42 provides a support and a mounting surface for a spindle face portion of the load motor/dynamometer 40.

The load motor/dynamometer 40 is a power source capable of providing torque assisted inertia during acceleration and deceleration of the spindle and for generating a torque to oppose the rotation of the spindle 12, to simulate a machine tool load. In this example, the load motor/dynamometer 40 can generate 300 Nm of torque up to 1800 rpm, with a maximum speed of 15,000 rpm. Preferably, a lower portion of the load motor/dynamometer 40 is mounted to the spindle forcing support 42, and a spindle face portion of the load motor 40 is mounted to a torque transducer flange 44 positioned between the load motor 40 and the forcing fixture 38.

The forcing fixture 38 is a radial, axial and torsional load transmission device that operatively transmits applied loads to the spindle 12. Preferably, the forcing fixture 38 includes a servo hydraulic cylinder, as is known in the art. In this example, there are two servo hydraulic cylinders 46 for transmitting an axial load, a radial load and a torque from the load motor/dynamometer 40. The forcing fixture 38 is attached to both the spindle forcing support 42 and a face of the spindle 12.

The spindle characterization system 10 includes a drive motor 48 to provide power to belt driven types of spindles 12. Preferably, the drive motor 48 utilizes the same rotor stator as the load motor/dynamometer 40 and the same power, torque and speed capabilities. However, a spindle face of the drive motor 48 includes a shaft for mounting belt drive pulleys for operating a belt drive spindle. In this example, the drive motor 48 is positioned behind the table assembly 20.

The facility 10 also includes a cross slide 50, as is known in the art, for adjusting a position of the drive motor 48 to accommodate a belt drive requirement for a belt driven spindle. The cross slide 50 is a generally planar adjustable surface for mounting the drive motor 48. The cross slide 50 is rigidly attached to the machine base 15.

The spindle characterization system 10 also includes a fluid containment device such as a flush box 52 mounted on the table top 22 and enclosing the spindle 12. The flush box 52 has a box-like structure and provides a container for coolant that may be pumped through the spindle 12 (referred to as through coolant) or onto a face of the spindle 12 (referred to as flush coolant). Advantageously, the spindle 12 can be tested using controlled temperature flush coolant and through coolant to simulate a plant floor machining environment.

The spindle characterization system 10 also includes a lubrication system generally shown at 67 to accommodate spindles requiring grease, air/oil or flooded oil lubrication, as is known in the art. The system 10 further includes an air supply system, or pneumatics 56, to provide controlled pressure air purge or positive internal pressure for spindles with different designs of seals (not shown) within the spindle 12. Advantageously, the seal can be evaluated while simulating the environment of a typical machine.

The system 10 may include a sub floor 54 within the structure 14 to provide a space to locate fluid lines. Further, the system 10 may include a scatter shield 84 for covering any rotating components of the spindle forcing assembly 36.

The system 10 may include other component parts which are conventional and well known in the art for evaluating the characteristics of the various types of spindles. Examples of known components include a drip pan 86 for containing fluid from a leak, a hydraulic pump (not shown) for providing hydraulic oil to the load cylinders 46, a spindle chiller 58 for regulating the temperature of the spindle 12, a machine chiller 60 for regulating a temperature of the load motor/dynamometer 40, drive motor 48 or forcing fixture 38, coolant pumps 62 for providing flush coolant or through coolant to the spindle 12, and related filters 64. Another example of a component part includes a heater 66 to elevate the coolant temperature to simulate plant conditions. A further example of a component part is a sensor, such as for monitoring spindle temperatures, vibration, speed, applied loads, air and lubrication status.

The spindle characterization system 10 further includes a programmable controller 68, as is known in the art, for providing computerized numeric control of the system 10. The controller 68 can be operatively programmed by a user 16 via a control panel 70. It should be appreciated that the user 16 can set various test conditions, including but not limited to cycle speed, duration, temperature and radial, axial and torsional loads. The programmable controller 68 is in communication with a computer system 74 via a communication line 72.

The spindle characterization system 10 also includes a computer system 74, as is known in the art, for communicating with the programmable controller 68. Preferably, the computer system 74 allows the user 16 to input data and analyze data from various characterization evaluations. The computer system 74 includes a processor 76 with a memory, a display terminal 78 and a user interactive device, such as a keyboard 80 or a mouse 82. The user 16 may input a set of parameters or set of instructions into the computer system 74 when prompted to do so for the characterization evaluation. One example of an input method is a pop-up window containing available options.

In operation, a spindle 12 to be evaluated is mounted on the base plate portion of the spindle mounting mechanism 30, and the table height is adjusted. The spindle is operatively connected to the spindle forcing fixture 38 and load motor/dynamometer 40. All other connections, as previously described, are made. Preferably, adapters or the like are utilized to accommodate various types of spindles 12.

A user 16 selects a specific evaluation type and enters corresponding test parameters into the programmable controller 68 or the computer system 74. Examples of test parameters include the magnitude of loads, frequency and duration of the applied load, the spindle speed, and fluid variables. It should be appreciated that a spindle test can have various objectives, including simulating an existing machine environment for the spindle 12, simulating a new environment, and determining the characteristics of a particular spindle type, including load, speed and coolant and air purge control within the aforementioned types of environments.

For example, the evaluation can simulate an actual machining cycle with up to two speed variations within a cycle, measure acceleration and deceleration characteristics, measure vibrational and thermal characteristics at idle, steady state or variable speeds. Additionally, the evaluation can measure vibration and thermal characteristics under various types of loads and with various types of coolants at various temperatures. Further, the evaluation can measure spindle accuracy by measuring a spindle nose or a tool holder displacement, and determine performance of seals within the spindle 12 when subjected to different air flows or pressures. The evaluation can measure dynamic stiffness of the spindle 12. In addition, for a belt driven spindle type, the evaluation can measure the influence of belt tension on spindle accuracy.

The spindle is accelerated to the desired speed by the drive motor 48 or integral spindle motor. It should be appreciated that the load motor/dynamometer is acting as a motor to provide assisted inertial acceleration. Once the desired speed is attained, the load motor/dynamometer 40 functions as a dynamometer for applying the desired torsional loads. Also, the forcing fixture 38 applies axial and radial loads and any oscillations to the spindle 12. Further, the actual production environment is simulated using controlled temperature through coolant and flush coolant. The air supply mechanism provides controlled pressure air purge or positive internal pressure for spindles with different seal designs.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A spindle characterization system for characterizing performance of a spindle used in an industrial machine comprising:

a machine base providing a mounting and support surface, wherein said machine base has a recessed portion;

a table base assembly for supporting the spindle, said table base assembly being disposed within said recessed portion of said machine base, wherein said table base assembly includes a table top and a height adjustment mechanism for adjusting a height of said table top;

a spindle mounting mechanism, wherein said spindle mounting mechanism has a top portion mounted to the spindle and a bottom portion mounted to said table top;

a spindle forcing assembly mounted to said machine base and operatively connected to the spindle, wherein said spindle forcing assembly generates an axial load, radial load and a torque that is applied to the spindle to simulate a machine tool load;

a programmable controller operatively connected to said spindle forcing assembly for providing computerized numeric control; and a computer system in communication with said programmable controller.

2. A spindle characterization system as set forth in claim 1 including a structure providing a housing for the said system.

3. A spindle characterization system as set forth in claim 1 including a lubrication system providing lubrication for spindles needing lubrication.

4. A spindle characterization system as set forth in claim 1 wherein said table base assembly is rigidly constructed from a metal material for increased dynamic stiffness.

5. A spindle characterization system as set forth in claim 1 wherein said table base assembly includes a height adjustment mechanism for vertically adjusting a height of said table top and a locking mechanism for maintaining the table top height.

6. A spindle characterization system as set forth in claim 1 wherein said spindle mounting mechanism includes a generally planer base plate for attaching the spindle to said table top.

7. A spindle characterization system as set forth in claim 1 wherein said spindle mounting mechanism includes a spindle face adapter for coupling the spindle to said spindle forcing assembly.

8. A spindle characterization system as set forth in claim 1 wherein said spindle forcing assembly includes a load motor/dynamometer for providing assisted inertia during acceleration and deceleration of the spindle and for generating a torque to oppose rotation of the spindle.

9. A spindle characterization system as set forth in claim 8 wherein said spindle forcing assembly includes a forcing fixture for transmitting the radial load, axial load or torque to the spindle.

10. A spindle characterization system as set forth in claim 9 wherein said forcing fixture includes a first servo hydraulic cylinder for transmitting an axial load, and a second servo hydraulic cylinder for transmitting a radial load.

11. A spindle characterization system as set forth in claim 1 including a drive motor operatively connected to a belt driven spindle for providing power to the belt driven spindle.

12. A spindle characterization system as set forth in claim 11, wherein said drive motor is mounted on a cross slide for adjusting a position of the drive motor relative to the spindle.

13. A spindle characterization system as set forth in claim 1 including a fluid containment device surrounding the spindle, wherein said fluid containment device contains a controlled temperature coolant pumped through the spindle.

14. A spindle characterization system as set forth in claim 1 including an air supply unit to supply controlled air purge or positive internal pressure to evaluate a seal in the spindle.

15. A spindle characterization system for characterizing performance of a spindle used in an industrial machine comprising:
   a machine base providing a mounting and support surface, wherein said machine base has a recessed portion;
   a table base assembly for supporting the spindle, said table base assembly being disposed within said recessed portion in said machine base, wherein said table base assembly is rigidly constructed from a metal material for increased dynamic stiffness;
   a height adjustment mechanism for vertically adjusting and locking a height of said table base assembly;
   a spindle mounting mechanism, wherein said spindle mounting mechanism has a top portion mounted to the spindle and a bottom portion mounted to said table base assembly;
   a spindle forcing assembly mounted to said machine base and operatively connected to the spindle, wherein said spindle forcing assembly includes a load motor/dynamometer for providing assisted inertia during acceleration and deceleration of the spindle and for generating a torque and a forcing fixture for transmitting the radial load, axial load or torque to the spindle to simulate a machine tool load;
   a programmable controller operatively connected to said spindle forcing assembly for providing computerized numeric control; and
   a computer system in communication with the programmable controller.

16. A spindle characterization system as set form in claim 15, including a structure providing a housing for said system.

17. A spindle characterization system as set forth in claim 15 wherein said forcing fixture includes a first servo hydraulic cylinder for transmitting an axial load, and a second servo hydraulic cylinder for transmitting a radial load.

18. A spindle characterization system as set forth in claim 15 including a drive motor operatively connected to a belt driven spindle, for providing power to the belt driven spindle, wherein the drive motor is mounted on a cross slide for adjusting a position of the drive motor relative to the spindle.

19. A spindle characterization system as set forth in claim 15 including a fluid containment device surrounding the spindle, wherein said fluid containment device contains a temperature controlled coolant pumped through the spindle.

20. A spindle characterization system for characterizing performance of a spindle used in an industrial machine comprising:
   a machine base providing a mounting and support surface, wherein said machine base has a recessed portion;
   a table base assembly for supporting the spindle, said table base assembly being disposed within said recessed portion in said machine base, wherein said table base assembly is rigidly constructed from a metal material for increased dynamic stiffness;
   a height adjustment mechanism for vertically adjusting and locking a height of said table base assembly;
   a spindle mounting mechanism, wherein said spindle mounting mechanism has a top portion mounted to the spindle and a bottom portion mounted to said table base assembly;
   a spindle forcing assembly mounted to said machine base and operatively connected to the spindle, wherein said spindle forcing assembly includes a load motor/dynamometer for providing assisted inertia during acceleration and deceleration of the spindle and for generating a torque and a force fixture for transmitting the torque to the spindle to simulate a machine tool load;
   wherein said forcing fixture includes a first servo hydraulic cylinder for transmitting an axial load, and a second servo hydraulic cylinder for transmitting a radial load;
   a programmable controller operatively connected to said spindle forcing assembly for providing computerized numeric control; and
   a computer system in communication with the programmable controller.

* * * * *